United States Patent
Okamuro et al.

(10) Patent No.: US 6,348,695 B2
(45) Date of Patent: Feb. 19, 2002

(54) POSITION DETECTION APPARATUS

(75) Inventors: Takashi Okamuro; Hirokazu Sakuma, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/746,539

(22) Filed: Dec. 21, 2000

Related U.S. Application Data

(63) Continuation of application No. PCT/JP98/03934, filed on Sep. 2, 1998.

(51) Int. Cl.[7] .............................................. G01N 21/86
(52) U.S. Cl. .............................. 250/559.29; 250/559.33
(58) Field of Search ......................... 250/559.29, 559.33, 250/559.3, 201.2, 201.5, 221, 231.13, 231.18; 356/375, 373, 399–402; 396/79, 80, 86, 87, 120, 121

(56) References Cited

U.S. PATENT DOCUMENTS

| 4,931,940 A | 6/1990 | Ogawa et al. |
| 5,136,148 A | * 8/1992 | Nonaka .................... 250/201.4 |
| 5,391,992 A | 2/1995 | Adachi |
| 5,721,546 A | 2/1998 | Tsutsumishita |

FOREIGN PATENT DOCUMENTS

| JP | 63-180864 | 7/1988 |
| JP | 64-56929 | 3/1989 |
| JP | 1-301115 | 12/1989 |
| JP | 2-75524 | 6/1990 |
| JP | 5-240631 | 9/1993 |
| JP | 6-94406 | 4/1994 |
| JP | 62-260574 | 3/1996 |
| JP | 8-261794 | 10/1996 |

OTHER PUBLICATIONS

"Theory of AC Servo System and its Design", Hidehiko Sugimoto et al, Synthetic Electron Publishing Co., May 8, 1990 (English Abstract).

* cited by examiner

*Primary Examiner*—Que T. Le
(74) *Attorney, Agent, or Firm*—Sughrue Mion, PLLC

(57) ABSTRACT

A position detection apparatus which can control an apparatus to be controlled, such as a motor or the like, more precisely, is disclosed. When a predetermined time has passed since reception of a request signal for requesting output of the position data was detected, the position detector measures the output of a sensor for detecting the position of an object to be measured, and calculates the position data representing the position of the object at a point of time when the measurement was performed, based on the measured output. Moreover, the position detector measures the reception interval of the request signal, calculates the corrected position data representing the position of the object at the time of receiving the request signal whose reception interval was measured, using a value obtained by subtracting the predetermined time from the measured reception interval, the calculated position data, and a change rate in a presumed position of the object, and outputs the corrected position data as a response to the request signal.

12 Claims, 12 Drawing Sheets

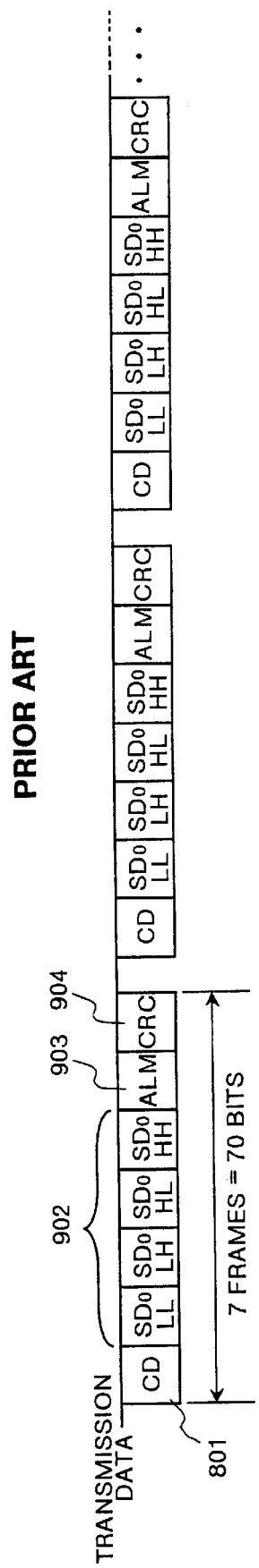

US 6,348,695 B2

POSITION DETECTION APPARATUS

This application is a continuation of PCT./JP98/03934 filed Sep. 2, 1998.

TECHNICAL FIELD

The present invention relates to a position detection apparatus. More specifically, this invention relates to a position detection apparatus in which data representing a position of an object to be measured is calculated from an output of a sensor for detecting a position of the object.

BACKGROUND ART

Among position detection apparatus, there are some apparatuses in which data representing a position of an object to be measured is calculated from an output of a sensor, that is, some (not negligible) time is required for obtaining position data from the output of the sensor.

FIG. 10 shows one example of such a conventional position detection apparatus. This position detection apparatus 110 is a so-called optical rotary encoder, which is a type connected to a motor controller 132 by a serial transmission line 131.

As shown in this figure, the position detection apparatus 110 comprises a light-emitting circuit 111, a photo-detecting circuit 112, a scale disc 113 and an amplifier 114. The position detection apparatus 110 also comprises a sample holding section 115, a multiplexer 116, an A/D converter 117, a microcomputer 18, a serial signal conversion circuit 119, and a serial signal transmission circuit 120.

The light-emitting circuit 111 is a circuit including light emission elements 121, M in number (M is a plural number). The photo-detecting circuit 112 is a circuit including photodetectors 122, M in number, which convert light from the light emission elements 121 in the light-emitting circuit 111 to electric signals (analog signals), respectively. The scale disc 113 (also referred to as a slit disc or a code-disc) is turntable machined so that the intensity of light incident on the photodetectors 122 in the photo-detecting circuit 112 changes, and by means of the rotation of this scale disc 113, M sine-wave signals or triangular wave signals having different periods or phases are output from the M photodetectors 122 in the photo-detecting circuit 112. Sine-wave signals can be output when a scale disc 133 with a sine-wave slit is used. However, sine-wave signals can be output even when a rectangular slit is used. Because, when a rectangular slit is used, a substantially sine-wave signal (pseudo sine-wave signal) can be obtained due to the diffraction effect of the light. The scale disc 133 is generally attached to a rotation shaft of a motor which is controlled by the motor controller 132.

The amplifier 114 is a circuit for amplifying the output of each photodetector 122 in the photo-detecting circuit 112. That is to say, the amplifier 114 is a circuit for outputting manalog signals. The sample holding section 115 includes M sample holding circuits respectively connected to M amplifying circuits in the amplifier 114. All the sample holding circuits in the sample holding section 115 are supplied with the sample holding signals from the microcomputer 118. That is to say, the sample holding section 115 simultaneously holds M signals which change time-wise, output from the amplifying circuit 114, when a sample holding signal instructing the holding operation is input, and subsequently continues to output the held M signals.

The multiplexer 116 outputs a signal instructed by the microcomputer 118, among M signals output from the sample holding section 115. The A/D converter 117 converts the analog signal output from the multiplexer 116 to a digital signal, and the control of the operation timing of the A/D converter 117 is also performed by the microcomputer 118.

The serial signal conversion circuit 119 converts a parallel signal from the microcomputer 118 to a serial signal, and supplies the serial signal to the serial signal transmission circuit 120. The serial signal conversion circuit 119 also performs a processing which is reverse to this. When a predetermined signal is supplied from the serial signal transmission circuit 120 (when a request signal is received by the serial signal transmission circuit 120, and a signal corresponding to the request signal is supplied from the serial signal transmission circuit 120), the serial signal conversion circuit 119 outputs a signal for informing the microcomputer 118 of this matter.

The serial signal transmission circuit 120 is an interface circuit with the motor controller 132. The serial signal transmission circuit 120 prepares a transmission signal by subjecting the serial signal provided by the serial signal conversion circuit 19 to a predetermined processing (calculation of CRC, addition of start bit and stop bit, or the like), and supplies the prepared transmission signal to the motor controller 132 via the serial transmission line 131. The serial signal transmission circuit 120 also performs a processing for preparing a serial signal corresponding to the transmission signal received from the motor controller 132.

The microcomputer 118 is a control circuit of the position detection apparatus 110. The microcomputer 118 includes an input circuit 123, an output circuit 124, a CPU 125 and a timer 126, and the output of the A/D converter 117 is supplied to the CPU 125 via the input circuit 124. The sample holding signal is output from the output circuit 125 under the control of the CPU 125. The serial signal conversion circuit 119 is connected to the CPU 125.

Moreover, though not shown, the position detection apparatus 110 is provided with a circuit for detecting that the scale disc 113 has made one revolution from the output of a specific photodetector 122 in the photo-detecting circuit 112, and a multi-turn counter for counting how many revolutions the scale disc 113 has made based on the detection result of the circuit, and the multi-turn counter is also connected to the CPU 125.

The overall operation of the position detection apparatus 110 will now be described, with reference to FIG. 10 and FIG. 11. In FIG. 11, (A) illustrates a timing for the position detection apparatus 110 to receive a request signal from the motor controller 132, (B) illustrates the time change in a value of a timer 126 in the microcomputer 118. (C) illustrates the time change in the sample holding signal output from the microcomputer 118 to the sample holding section 115, and (D) illustrates the time change in the contents of processing executed by the CPU 125. Finally, (E) illustrates the timing when a position signal is transmitted from the position detection apparatus 110.

The position detection apparatus 110 is an apparatus which supplies a position signal holding position data representing the position of the scale disc 113 at the time when it receives a request signal from the motor controller 132 via the serial transmission line 131, as a response to the request signal, via the serial transmission line 131 to the motor controller 132.

The position data handed over to the motor controller 132 comprises 2-byte data showing how many turns the scale disc 113 has made until then, and 2-byte data related to the angle of rotation of the scale disc 113. The former data is obtained from the multi-turn counter, and hence required data related to the time can be obtained immediately. The data related to the angle of rotation, however, is calculated by numerical operation based on the output of the photo-detecting section 112, and hence, relatively long period of time is required for the completion of processing to obtain the data. Accordingly, if it is so constructed that the processing is to be started at the time of reception of the request signal, the position data representing the position of the slit disc 113 at the time when the request signal is transmitted is received, after a while after the transmission of the request signal.

From the view point of the motor controller side, it is convenient that the position data representing the position of the scale disc 113 can be obtained at the time when the request signal is transmitted. Hence, with this position detection apparatus 110, the position data handed over to the motor controller 132 at the time of reception of the request signal is generally obtained before reception of the request signal. A position detection apparatus in which the position data related to the transmission time is calculated (presumed) from the position data derived from the measurement value is known. In this apparatus the position data is transmitted before reception of the next request signal.

Precisely, the CPU 125 in the position detection apparatus 110 clears the timer 126 to be 0, every time it is detects that the request signal is received, as shown in FIG. 11 (A) and (B). Then, the CPU 125 starts processing for obtaining the position data, when the value of the timer 126 becomes $TM_{SET}$. Here, $TM_{SET}$ is data given to the CPU 125 beforehand.

For example, if it is assumed that the time when the request signal is received is time $t_b$, the CPU 125 starts processing for obtaining the position data at time $t_c$ after time $TM_{SET}$ has passed since time $t_b$.

As schematically shown in FIGS. 11 (C) and (D), at the time of this processing, the CPU 125 designates the sample holding signal as "L", to thereby have the sample holding section 115 hold M signals which are being output from the amplifying section 114. Then, the CPU 125 performs control of the A/D converter 117 or the like, to obtain M data corresponding to the output of the M photodetectors. The CPU 125 then returns the sample holding signal to "H" (high logical level), and calculates the position data $DT_0$ at time $t_b$ when the sample holding signal is designated as "L" (low logical level) (when the hold command is given to the A/D converter 117), from the obtained M data and the value of the multi-turn counter. In this processing, M' (in this apparatus, M'=16) bit data representing the angle of rotation are obtained from the M data. Data comprising the data and the multi-turn counter value are designated as the position data $DT_0$.

The CPU 125 then performs calculation expressed with the following expression (hereinafter, referred to as correction expression), in order to obtain transmission position data $SD_0$ which is position data to be informed to the motor controller 132 as a response to the request signal to be received thereafter.

$$SD_0 = DT_0 + (SD_{-1} - SD_{-2}) \times (TM_{RQ} - TM_{SET})/TM_{RQ}$$

Here, $SD_{-1}$ and $SD_{-2}$ are respectively transmission position data calculated (transmitted) last time and the last but one. $TM_{RQ}$ is data given to the CPU 125 beforehand, as a period of the request signal output from the motor controller 132 connected to the position detection apparatus 110.

The CPU 125 then supplies the calculated $SD_0$ to the serial signal transmission circuit 120 via the serial signal conversion circuit 119, when the request signal is received in a later stage, and as a result, the position signal holding $SD_0$ is transmitted on the serial transmission line 131 (see FIG. 11 (E)).

Here, the reason why the transmission position data $SD_0$ is obtained from the above-described correction expression will be described in brief.

With this position detection apparatus 110, the time $t_c$ when the hold command is issued is a time after time $TM_{SET}$ has passed since the reception time $t_b$ of the request signal, and the time when the next request signal is to be received should be time $t_d$ after time $TM_{RQ}$ has passed since the time $t_b$. Accordingly, if it is assumed that the change rate (variation per unit time) of the position of the scale disc 113 between time $t_c$ and $t_d$ is V, the transmission position data $SD_0$ to be transmitted at the time of reception of the next request signal is expressed by the following expression:

$$SD_0 = DT_0 + (t_d - t_c) \times V$$
$$= DT_0 + (TM_{RQ} - TM_{SET}) \times V.$$

If it is assumed that V is equal to the change rate of the position of the scale disc 113 between time $t_a$ and $t_b$ (that is, $(SD_{-1} - SD_{-2})/TM_{RQ}$), the above-described correction expression is fulfilled. Hence, with the position detection apparatus 110, $SD_0$ is calculated from the correction expression.

Since the conventional position detection apparatus 110 operates as described above, if the period of the request signal from the motor controller 132 exactly coincides with $TM_{RQ}$, when the request signal is received, the position data representing the position of the scale disc 113 at that time can be informed to the motor controller.

If the position detection apparatus is connected for use to a motor controller having the period $I_{RQ}$ of the request signal different from $TM_{RQ}$, when the request signal is received, the position detection apparatus 110 cannot inform the motor controller of the position data representing the position of the scale disc 113 at that time. Because, the transmission position data calculated by the CPU 125 is the position data representing the position of the scale disc 113 at the time when time $TM_{RQ}$ has passed since reception of the last request signal, and is not data at the time when time $I_{RQ}$ has passed.

That is to say, the conventional position detection apparatus 110 cannot be used in combination with other motor controllers having different request signal periods, or cannot be used in combination with motor controllers which change the request signal period by itself.

Moreover, in ordinary motor controllers, the transmission timing of the request signal is controlled by hardware and software. That is to say, transmission of request signals, once in several times, is performed in the manner synchronized with the signal having exact period output from the hardware, and transmission of other request signals is in many cases timing-controlled by the software. When the position detection apparatus 110 is connected to such a motor controller, the interval of the request signal input to the position detection apparatus 110 varies. When the interval of the request signal varies, as is obvious from the above-described operation procedure, the conventional position detection apparatus 110 outputs erroneous transmission position data, hence there may be a case where control of the motor is not performed properly.

Moreover, to improve the ability of the motor to a response, it is desired that position data having high precision (having many number of bits) can be supplied to the motor controller in a short period. In particular, with the synchronous motor, the position of the magnetic pole of a permanent magnet used for the field magnet changes at high speed during high-speed rotation, hence it is required that the position of the magnetic pole can be informed to the motor controller in a short period.

With the conventional position detection apparatus 110, however, the period in which the position data can be supplied to the motor controller 132 is limited by the transmission time of the position signal determined by the number of bits of the transmission position data, or by the time required for calculation of the transmission position data. As a result, there may be a case where the position detection apparatus cannot properly perform control of the motor or the like.

Specifically, the position detection apparatus 110 is an apparatus which transmits signals of 7 frames in total, as shown in FIG. 12, comprising a control signal (CD) 801, 4-byte transmission position data signals $(SD_0)$ 902, an alarm signal (ALM) 903, and a cyclic redundancy check signal (CRC) 904, as position signals, to the motor controller 132. Here, the frame shown on the left side in the figure is first transmitted.

Since one frame is formed by adding a start bit and a stop bit in front and back of the byte data to be transmitted, the total number of bits of this signal becomes 70 bits as shown in the figure. When the transfer speed for serial communication is 2.5 Mbps, the time required for the transmission of the 70-bit signal becomes 28 $\mu$s $(=70/(2.5\times10^6))$. Therefore, the position detection apparatus 110 cannot inform the motor controller 132 of the position data in a period shorter than this time. If the data transfer speed of the serial communication is increased, the period can be shortened, but since the signal becomes dull on the serial transmission line, it is actually impossible to increase the transfer speed than the current speed.

Moreover, since the time required for calculation of the transmission position data is a time in the same order as that required for transmission of the position signal, as shown schematically in FIG. 11. Hence, when the motor or the like is controlled using the conventional position detection apparatus 110, there is a case where the position data cannot be obtained in a period required for the control, depending on the control contents.

It is therefore an object of the present invention to provide a position detection apparatus which can properly control an apparatus to be controlled, such as a motor or the like for moving the position of an object to be measured.

DISCLOSURE OF THE INVENTION

The position detection apparatus according to the present invention comprises a detection unit which detects reception of a request signal which requests output of the position data; a sensor output measurement unit which measures the output of a sensor for detecting the position of an object to be measured, when a predetermined time has passed since reception of the request signal was detected by the detection unit; a position data calculation unit which calculates the position data representing the position of the object at a point of time when the measurement was performed, based on the output measured by the sensor output measurement unit; a corrected position data calculation unit which calculates corrected position data which is position data representing the position of the object at the time of receiving the request signal, using a value obtained by subtracting the predetermined time from the reception interval of the request signal, position data calculated by the position data calculation unit, and a presumed speed of the object; and an output unit which outputs the corrected position data calculated by the corrected position data calculation unit as a response to the request signal.

That is to say, with the position detection apparatus according to the present invention, when the position data (corrected position data) at the time of reception of the request signal is calculated (presumed), based on the position data related to a certain time calculated based on the output of the sensor, the elapsed time from that time till the request signal has been actually received is used. Accordingly, even if the reception period of the request signal changes, the position detection apparatus can output accurate position data, and if this position detection apparatus is used, accurate position data related to the object can be obtained in a desired frequency. As a result, with this position detection apparatus, an apparatus to be controlled (e.g. a motor) which changes the position of the object can be controlled more appropriately.

Moreover, the position detection apparatus according to the present invention comprises a detection unit which detects reception of a request signal for requesting output of the position data; a measurement processing execution unit which executes measurement of the sensor output for detecting a position of an object to be measured, every time multiples of time of an output period given in advance, being a period of an integral fraction of a period of the request signal, has passed, after a predetermined time has passed since the detection of the request signal, every time the reception of the request signal is detected by the detection unit; a position data calculation unit which calculates position data representing the position of the object at a point of time when measurement is performed, using a measured output, every time the output of the sensor is measured by the measurement processing execution unit; a corrected position data calculation unit which calculates the corrected position data, being position data representing the position of the object at a point of time first reached after measurement of the output by the sensor output measurement unit, which is a point of time when multiples of time of the output period has passed since the reception of the request signal, using a calculated position data, every time the position data is calculated by the position data calculation unit, the output period, the predetermined time and change rate of a presumed position of the object; and a corrected position data output unit which outputs the calculated corrected position data, every time the corrected position data is calculated by the corrected position data calculation unit, at a time when the corrected position data is representing a position.

That is to say, with the position detection apparatus according to the present invention, calculation and transmission of the corrected position data are performed in the previously given output period, while sometimes being synchronized with the request signal. Therefore, if this position detection apparatus is combined with the equipment which transmits only a request signal having an accurate period which is time-controlled by the hardware (for example, motor controller), it is possible to minimize the adverse effect on the control of an apparatus to be controlled due to difference in the reception interval of the request signal.

Moreover, when the position detection apparatus according to the present invention is realized, the position detection apparatus may be added with a monitoring unit which monitors the change rate of a position of the object and an output period change unit which changes a value of the output period to other values which are an integral fraction of a period of the request signal, depending on the monitoring result of the monitoring unit. When the monitoring unit is added, a bit length change unit which changes the bit length of the position data calculated by the position data calculation unit depending on the monitoring result of the monitoring unit may be also added.

By using the position detection apparatus according to the present invention, added with the monitoring unit or the like, it becomes possible to perform control of an apparatus to be controlled which is changing the position of the object in an environment depending on the change rate of the position of the object, thereby enabling appropriate control of the apparatus to be controlled.

Furthermore, when the position detection apparatus according to the present invention is realized, the position detection apparatus may be added with an output period change unit which changes a value of the output period to other values which are an integral fraction of a period of the request signal, depending on the assignment information included in the request signal detected by the detection unit.

That is to say, the position detection apparatus may be constructed such that the value of the output period is changed in response to the instruction from the equipment to be connected.

Also, the position detection apparatus according to the present invention comprises a detection discrimination unit which detects reception of a request signal for requesting an output of the position data, and discriminating whether the request signal whose reception has been detected is a first class request signal or a second class request signal; a measurement processing execution unit which executes processing for measuring the output of a sensor for detecting the position of the object, every time multiples of time of a period of the request signal given in advance has passed, after a predetermined time has passed since the reception detection of the first class request signal, every time the reception of the first class request signal is detected by the detection discrimination unit; a position data calculation unit which calculates position data representing the position of the object at a point of time when measurement is performed, using a measured output, every time the output of the sensor is measured by the measurement processing execution unit; a corrected position data calculation unit which calculates the corrected position data, being position data representing the position of the object at a point of time first reached after measurement of the output by the sensor output measurement unit, which is a point of time when multiples of time of the period has passed since the reception of the first class request signal, using the position data, every time the position data is calculated by the position data calculation unit, the period, the predetermined time and change rate of a presumed position of the object; and a corrected position data output unit which outputs the calculated corrected position data, every time the corrected position data is calculated by the corrected position data calculation unit, after the calculation, as a response to the first class request signal or the second class request signal whose reception has been detected by the detection discrimination unit.

That is to say, with the position detection apparatus according to the present invention, the first class request signal is used as a signal for deciding the timing for starting a processing for obtaining the corrected position data, and a signal for deciding the timing for executing the data output (transmission). On the other hand, the second class request signal is used only as a signal for deciding the timing for performing data output, and the start timing of the processing for obtaining the corrected position data output at the time of data output is decided based on the reception time of the first request signal.

Accordingly, if the position detection apparatus is combined with another equipment (e.g. motor controller) which outputs the first request signal at the time of outputting the request signal controlled by the hardware control and outputs the second request signal at the time of outputting the request signal controlled by the software control, even if the transmission timing of the request signal varies in the equipment, control itself of the apparatus to be controlled (e.g. motor) which is changing the position of the object can be performed without any problem.

When the position detection apparatus according to the present invention is realized, the position detection apparatus may be added with a transmission unit which transmits a signal having a first predetermined number of bits representing corrected position data, on a serial transmission line to which the equipment for outputting the request signal is connected, as a detection result, with regard to the corrected position data first output by the corrected position data output unit, and a signal having a second predetermined number of bits, which is smaller than the first predetermined number of bits, representing a difference between the corrected position data and corrected position data output last time, on the serial transmission line, as a detection result, with regard to the corrected position data output for the second time and after by the corrected position data output unit.

If the position detection apparatus added with this transmission unit is combined with an apparatus which stores the corrected position data represented by the first input signal as the absolute position data, adds data represented by the signal input after that to the absolute position data, and handles the absolute position data after the addition as data representing the position of an object at that point of time, and also controls the object directly or indirectly (e.g. motor controller), the time required for transmission of the corrected position data can be further shortened. That is to say, the acquisition frequency of the corrected position data can be increased, and as a result, the apparatus to be controlled (e.g. motor) can be controlled more appropriately.

BRIEF DESCRIPTION OF THE DRAWINGS

FIG. 11 is a timing chart for explaining the operation of the position detection apparatus in the prior art and FIG. 12 is a diagram showing a signal transmitted to a motor controller from the conventional position detection apparatus.

BEST MODE FOR CARRYING OUT THE INVENTION

Figure 1:
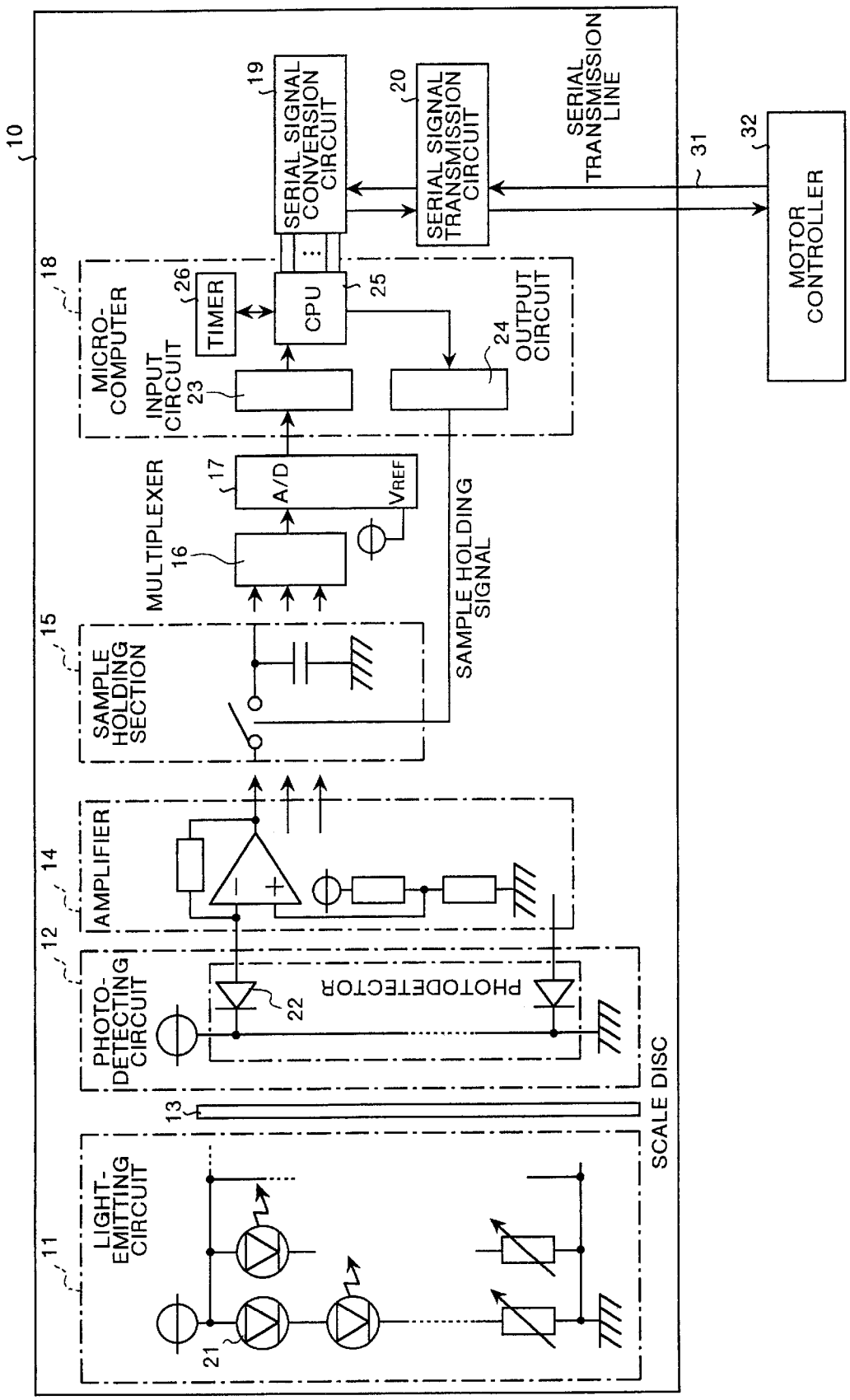
FIG. 1 is a diagram showing a construction of a position detection apparatus according to a first embodiment of the present invention.

To describe the present invention in more detail, the present invention will now be described with reference to the accompanying drawings. A schematic construction of a position detection apparatus according to the first embodiment of the present invention is shown in FIG. 1.

The position detection apparatus 10 according to the first embodiment is a so-called optical rotary encoder, and comprises a light-emitting circuit 11, a photo-detecting circuit 12, a scale disc 13 and an amplifier 14. The position detection apparatus 10 also comprises a sample holding section 15, a multiplexer 16, an A/D converter 17, a microcomputer 18, a serial signal conversion circuit 19, and a serial signal transmission circuit 20. Further, the position detection apparatus 10 comprises a circuit (not shown) which detects one revolution of the scale disc based on the output of a specific photodetector 22, and a multi-turn counter (not shown) which is a counter for counting up every time it is detected that the scale disc 13 makes one turn. This counter is connected to the CPU 25. The position detection apparatus 10 is connected to a motor controller 32 using a serial transmission line 31 and used.

Figure 2:
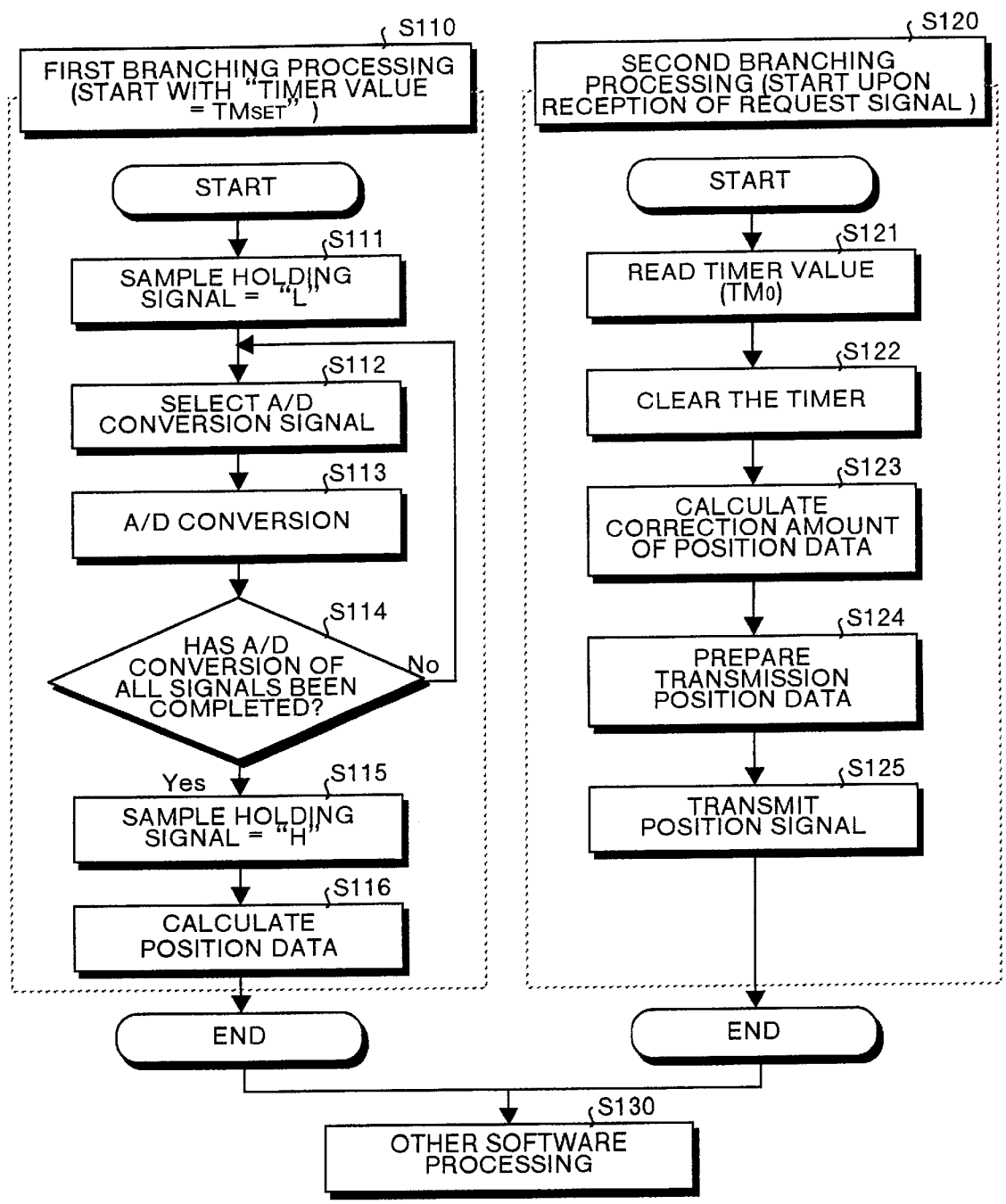
FIG. 2 is a flow chart showing the operation procedure of a CPU in the position detection apparatus according to the first embodiment.
Figure 3:
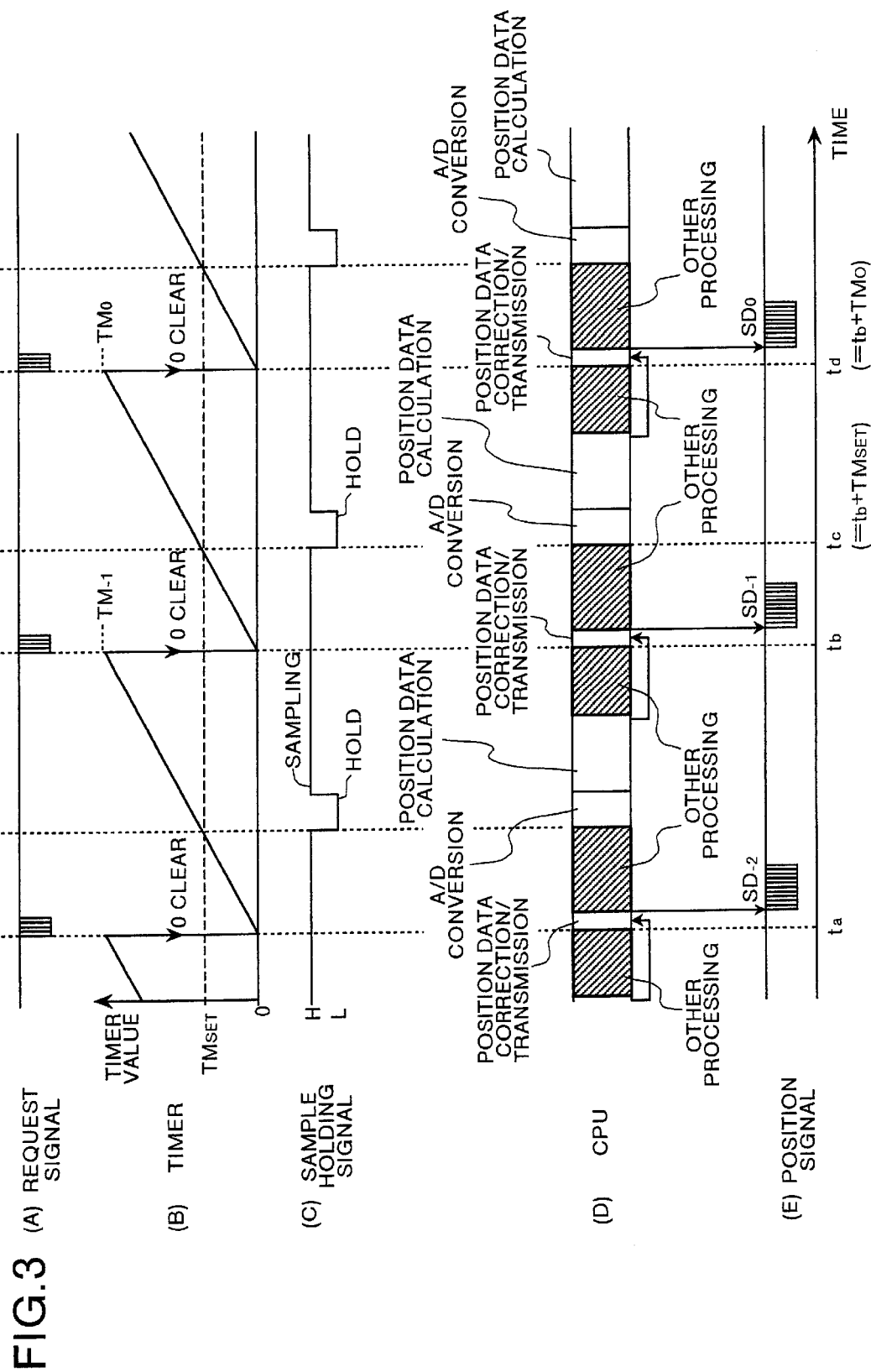
FIG. 3 is a timing chart for explaining the operation of the position detection apparatus according to the first embodiment.

Sections other than the microcomputer 18 of the position detection apparatus 10 perform the same operation as those having the same name in the position detection apparatus 110. Hence, the operation of the position detection apparatus 10 will be described below, mainly for the control operation by the microcomputer 18 (CPU 25), with reference to FIG. 2 and FIG. 3. FIG. 2 is a flow chart showing the sequence of operation of the microcomputer 18 (CPU 25). FIG. 3 (A) illustrates a timing for the position detection apparatus 10 to receive a request signal from the motor controller 32, (B) illustrates the time change in a value of a timer 26 in the microcomputer 18. (C) illustrates the timing that the sample holding signal is output from the microcomputer 18 to the sample holding section 15, and (D) rates the time change in the contents of processing executed by the CPU 25. Finally, (E) illustrates the timing when a position signal holding the transmission position data is transmitted from the position detection apparatus 10.

As shown in FIG. 2, the processing executed by the CPU 25 is largely divided into a first branching processing (step S110) which is initiated when the value of the timer 26 becomes a predetermined value $TM_{SET}$, a second branching processing (step S120) which is initiated when the request signal is received and other software processing (step S130) which is a processing performed when each branching processing is not performed.

At first, the operation of the CPU 25 at the time of the first branching processing will be described.

When the value of the timer 26 becomes a predetermined value $TM_{SET}$, the CPU 25 suspends other active software processing, and designates the sample holding signal as "L", to thereby have the sample holding section 15 hold M signals from the amplifier 14 (step S111). That is to say, the CPU 25 fixes the signal input to the multiplexer 16 to a signal representing the condition of the scale disc 13 when the value of the timer 26 becomes $TM_{SET}$.

Thereafter, the CPU 25 supplies a predetermined selection signal to the multiplexer 16 so that one of M signals input to the multiplexer 16 is supplied to the A/D converter 17 (step S112). Then, the CPU 25 operates the A/D converter 17, and as a result, the data output from the A/D converter 17 is stored (step S113). Thereafter, if there remain signals which have not been subjected to the processing in steps S112 and S113 (step S114: No) in signals output by the multiplexer 16, the CPU 25 returns the process to step S112, to perform processing for unprocessed signals.

When acquisition of the A/D conversion results of all (M) signals output by the multiplexer 16 has been completed (step S114: Yes), the CPU 25 returns the sample holding signal to the level "H" (step S115). Further, the CPU 25 calculates position data $DT_0$ at the time when the value of the timer 26 is $TM_{SET}$, from the obtained M data and the value of the multi-turn counter, and stores the data (step S116). Then, the CPU 25 completes the first branching processing, and starts other software processing.

For example, when the request signal is received at time $t_b$, the CPU 25 starts the first branching processing at time $t_c$ ($t_b+TM_{SET}$). That is to say, as schematically shown in FIGS. 3(C) and (D), the CPU 25 designates the sample holding signal as "L" at time $t_c$, as well as starting control of the multiplexer 16 and the A/D converter 17 to thereby obtain M data. The CPU 25 then returns the sample holding signal to the level "H", and calculates the position data $DT_0$ at time $t_c$. Then, the CPU 25 completes the first branching processing and starts other processing.

Next, operation of the CPU 25 at the time of the second branching processing will be described while referring to FIG. 2.

When reception of the request signal is detected, the CPU 25 starts the second branching processing (step S120), reads the value of the timer 26 at that point of time, and stores the value as $TM_0$ (step S121). The CPU 25 then clears the timer 26 to be 0 (step S122).

Then, the CPU 25 calculates the correction amount which is a value that the transmission position data $SD_0$ can be obtained by adding it to the position data $DT_0$ (step S123). Specifically, the correction DTD is calculated from the transmission position data $SD_{-1}$ calculated last time, the transmission position data $SD_{-2}$ calculated last but one, the timer value $TM_{-1}$ read at the time of executing the last second branching processing, the timer value $TM_0$ read this time, and $TM_{SET}$, by using the following expression:

$$DTD=(SD_{-1}-SD_{-2})\times(TM_0-TM_{SET})/TM_{-1}.$$

Here, the reason why the correction amount (difference between $SD_0$ and $DT_0$) is calculated using the above expression will be described with reference to FIG. 3.

The transmission position data $SD_0$ to be transmitted as a response to the request signal received at time $t_d$ is data that can be obtained by adding the variation of the position between time $t_c$ and $t_d$ to the position data $DT_0$. The variation (that is, the correction amount DTD) can be expressed by the following expression, if the change rate of the position (variation per unit time) between time $t_c$ and $t_d$ is assumed to be V:

$$DTD=(t_d-t_c)\times V.$$

Here, since $t_c=t_b+TM_{SET}$, and $t_d=t_c+TM_0$, $t_d-t_c=TM_0-TM_{SET}$ is fulfilled. Also, since V can be assumed to be equal to the velocity between time $t_c$ and $t_d$, an expression of $V=(SD_{-1}-SD_{-2})/TM_{-1}$ can be set up, and after all, DTD can be calculated from $TM_0$, $TM_{SET}$, $SD_{-1}$, $SD_{-2}$ and $TM_{-1}$ by the above-described expression.

Operation of the CPU 25 after calculation of the correction amount DTD will be described while referring to FIG. 2.

After calculation of the correction amount DTD, the CPU 25 adds the calculated DTD to the position data $DT_0$ calculated at the time of the first branching processing to prepare the transmission position data $SD_0$ (step S124). In this step, the CPU 25 also executes the processing for designating the data heretofore stored as transmission position data $SD_{-1}$ and transmission position data $SD_0$, as transmission position data $SD_{-2}$ and transmission position data $SD_{-1}$, respectively.

The CPU 25 then supplies the prepared transmission position data $SD_0$ to the serial signal conversion circuit 19, to thereby transmit a position signal in a conventional format holding the transmission position data $SD_0$ (see FIG. 12) to the serial signal transmission circuit 20 (step S125), and hence completes the second branching processing.

As described above, with the position detection apparatus 10 according to the first embodiment, the reception interval $(TM_0)$ of the request signal is measured, and the transmission position data $SD_0$ is calculated from the position data $DT_0$, using the measured reception interval. Accordingly, even if the position detection apparatus 10 is connected to other motor controllers having different request signal period, the position detection apparatus 10 can output accurate position data. In other words, the position detection apparatus 10 according to this invention can output the exact position of the scale disc 13 at a required frequency (provided that there is an upper limit in the frequency). As a result, use of the position detection apparatus 10 enables more appropriate control of the motor which changes the position (angle of rotation) of the slit disc 13.

The position detection apparatus 10 is constructed so as to calculate DTD, using $(SD_{-1}-SD_{-2})/TM_{-1}$ as the change rate V. However, instead of $(SD_{-1}-SD_{-2})/TM_{-1}$, $(DT_{0}-DT_{-1})/TM_{-1}$ ($DT_{-1}$ is position data calculated in the last first branching processing) or $(DT_0-SD_{-1})/TM_{SET}$ may be used. That is to say, the position detection apparatus 10 may be modified so that DTD is calculated using the change rate between time $t_a+TM_{SET}$ and time $t_c$ $(=t_b+TM_{SET}=t_a+TM_{-1}+TM_{SET})$, or the change rate between time $t_b$ and time $t_c$ $(=t_b+TM_{SET})$.

The hardware construction of the position detection apparatus according to the second embodiment of the present invention is the same as that of the position detection apparatus 10 according to the first embodiment, and hence FIG. 1 is used as a figure showing the construction thereof.

The position detection apparatus according to the second embodiment is connected for use to a motor controller 32 which transmits the request signal in a period $I_{RQ}$, and which can receive the position data even when the request signal is not transmitted. Moreover, the CPU 25 in the position detection apparatus is provided with $TM_{SET}$ and $TM_{LMT}$ ($>TM_{SET}$) whose value coincides with $I_{RQ}/N$ (N is an integer equal to or larger than 2), before starting to use the position detection apparatus.

Figure 4:
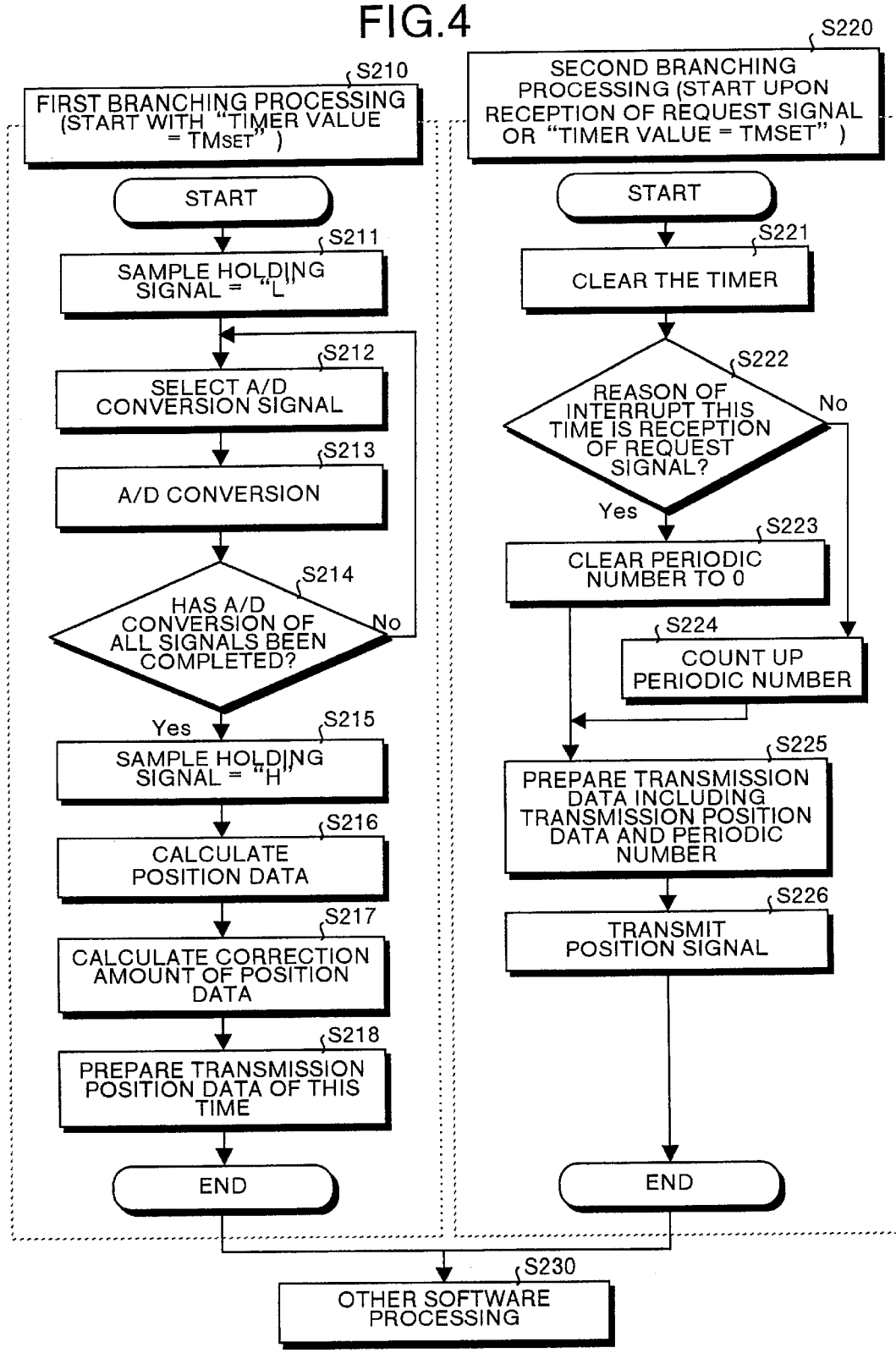
FIG. 4 is a flow chart showing the operation procedure of a CPU in a position detection apparatus according to a second embodiment of the present invention.

Then, while the position detection apparatus is being used, the CPU 25 executes any one of the first branching processing (step S210), the second branching processing (step S220) and other software processing (step S230), as shown in FIG. 4.

That is to say, when the value of a timer 26 becomes $TM_{SET}$, the CPU 25 suspends other software processing (step S230) that has been active, and executes the first branching processing (step S210). Moreover, when the request signal from the motor controller 32 is received, and when the value of the timer 26 becomes $TM_{LMT}$, the CPU 25 executes the second branching processing.

As shown in the figure, at the time of starting the first branching processing, the CPU 25 first designates the sample holding signal as "L", to thereby have a sample holding section 15 hold M signals from an amplifier 14 (step S211). That is to say, the CPU 25 fixes the signal input to a multiplexer 16 to a signal representing the condition of a scale disc 13 when the value of the timer 26 becomes $TM_{SET}$.

Thereafter, the CPU 25 supplies a predetermined selection signal to the multiplexer 16 so that one of M signals input to the multiplexer 16 is supplied to an A/D converter 17 (step S212). Then, the CPU 25 operates the A/D converter 17, and as a result, the data output from the A/D converter 17 is stored (step S213). If there remain signals which have not been subjected to the processing in steps S212 and 313 (step S214: No), the process returns to step S212, to perform processing for unprocessed signals. When processing with respect to the whole (M) signals has been completed (step S214: Yes), the CPU 25 returns the sample holding signal to the level "H" (step S215), and calculates position data $DT_0$ when the value of the timer 26 is $TM_{SET}$ from the obtained M data (step S216.).

Then, the CPU 25 calculates the correction amount DTD with respect to the position data $DT_0$ (step S227). Specifically, in this step S227, the CPU 25 calculates the correction amount DTD from the transmission position data $SD_{-1}$ transmitted last time, the transmission position data $SD_{-2}$ transmitted last but one, $TM_{LMT}$ and $TM_{SET}$ by using the following expression:

$$DTD=(SD_{-1}-SD_{-2})\times(TM_{LMT}-TM_{SET})/TM_{LMT}.$$

Then, the CPU 25 adds the calculated DTD to the position data $DT_0$ to prepare the transmission position data $SD_0$ this time (step S228). The CPU 25 then completes the first branching processing and starts the other software processing (step S230).

When the request signal is received, or when the value of the timer 26 becomes $TM_{LMT}$, the CPU 25 starts the second branching processing (step S220), and first clears the timer 26 to be 0 (step S221).

If the reason why the second branching processing is started is reception of the request signal (step S222: Yes), the CPU designates the periodic number as "0" (step S223). On the other hand, if the reason is coincidence of the value of the timer 26 with $TM_{LMT}$ (step S222: No), the CPU increments the periodic number by "1" (step S224).

Figure 5:
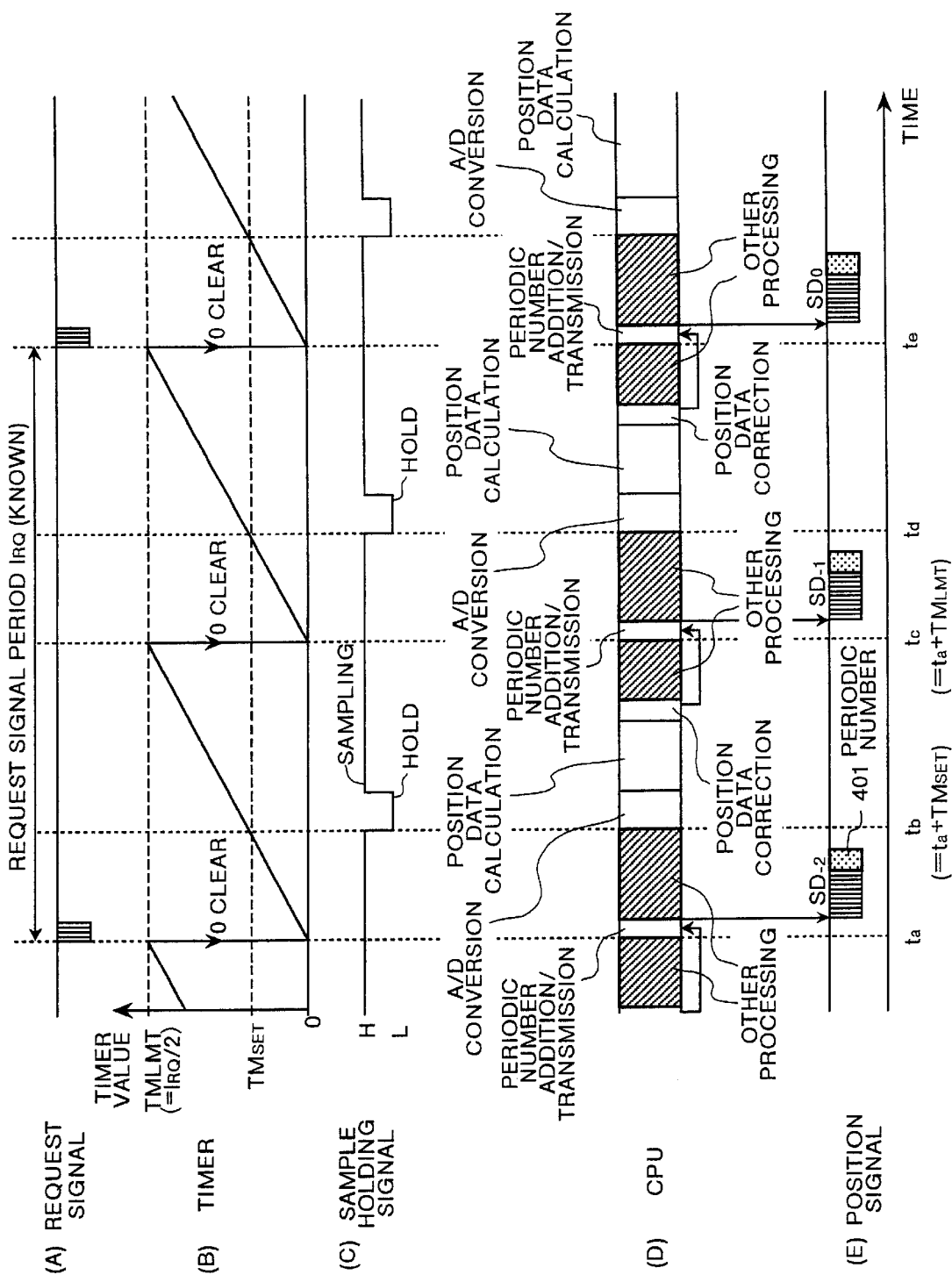
FIG. 5 is a timing chart for explaining the operation of the position detection apparatus according to the second embodiment.

Thereafter, the CPU 25 prepares transmission data including the transmission position data and the periodic number (step S225). Then, the CPU 25 transmits a position signal holding the transmission data by means of a serial signal transmission circuit 20, utilizing a serial signal conversion circuit 19 or the like (step S226). That is to say, the position signal including a periodic number that takes a value of from 0 to N−1 ($N=I_{RQ}/TM_{LMT}$), which is the information representing the number of position signals transmitted after reception of the request signal is transmitted, so that processing with respect to the position signal can be easily performed on the motor controller 32 side. Then, the second branching processing is completed. The operation of the position detection apparatus according to the second embodiment will now be described more specifically with reference to FIG. 5. A case such that N=2 (the case where $I_{RQ}=2\times TM_{RQ}$) will be taken as an example.

As is obvious from the above description, when detecting reception of the request signal (at the time of the second branching processing), the CPU 25 clears the timer 26 to be 0. Then, the CPU 25 starts the first branching processing when the value of the timer 26 becomes $TM_{SET}$.

Therefore, when the request signal is received at time $t_a$, since the timer is cleared to be 0 at time $t_a$, it means that the CPU 25 starts the first branching processing at time $t_b$ $(=t_a+TM_{SET})$.

At the time of the first branching-processing, the CPU 25 designates the sample holding signal as "L", as well as performing control of the multiplexer 16, the A/D converter 17 or the like, to thereby obtain M data. The CPU 25 then returns the sample holding signal to the level "H", and calculates the position data $DT_0$ representing the position at time $t_b$ from the obtained M data. Moreover, the CPU 25 determines the estimated value of the variation of the position from time $t_b$ to time $t_c$ (that is, correction amount DTD), and adds the estimated value to the position data DT, to thereby obtain transmission position data $SD_0$ representing the position of the slit disc 113 at time $t_c$.

In this case, after that, the value of the timer 26 becomes $TM_{LMT}$ before the next request signal is received. Therefore, the CPU 25 increments the periodic number by "1", after having cleared the timer 26 to 0. As a result, the periodic number becomes "1" which shows that the transmission position data is the first data not depending on the reception of the request signal, and the CPU 25 prepares the transmission data including the periodic number and the transmission position data. By supplying the transmission data to the serial signal conversion circuit 19, the CPU 25 transmits a position signal holding the transmission data by means of the serial signal transmission circuit 20.

On the other hand, the motor controller can recognize that the transmitted position data is data obtained at which time, from the periodic number included in the received position signal.

Thereafter, since the value of the timer 26 becomes $TM_{SET}$ at time $t_d$ $(=t_c+TM_{SET}=t_a+TM_{LMT}+TM_{SET})$, the CPU 25 restarts the first branching processing to thereby obtain new transmission position data $SD_0$.

Thereafter, at time $t_e$, since the request signal is received, the CPU 25 clears the timer 26 to 0 and designates the periodic number as "0". Then, the CPU 25 prepares the transmission data including the periodic number showing that the transmission position data is data depending on the reception of the request signal, and supplies the transmission data to the serial signal conversion circuit 19, to thereby transmit a position signal according to the transmission data by means of the serial signal transmission circuit 20.

As described above, the position detection apparatus according to the second embodiment performs calculation and transmission of the position data at a period $TM_{SET}$ given in advance, which is synchronized with a reception period of the request signal. Therefore, if the position detection apparatus according to the second embodiment is combined with a motor controller which transmits only a request signal having accurate period time-controlled by the hardware, adverse effect on the motor control due to a difference in the transmission (reception) interval of the request signal can be minimized.

The position detection apparatus according to the second embodiment transmits a position signal including a periodic number showing which period the position data is in since the reception of the request signal. This is for not increasing the processing load on the motor controller side, hence it is also possible to construct the position detection apparatus so as to transmit a signal without having a periodic signal.

The hardware construction of the position detection apparatus according to the third embodiment of the present invention is the same as that of the position detection apparatus 10 according to the first embodiment. However, the CPU 25 in the position detection apparatus is programmed so as to operate differently from the CPU 25 in the position detection apparatus according to the first embodiment. Also, the CPU 25 is provided with $TM_{SET}$ and $TM_{LMT}$ ($>TM_{SET}$) whose value coincides with the request signal period, before starting to use the position detection apparatus. $TM_{SET}$ and $TM_{LMT}$ are also supplied to a timer 26, and when the value thereof becomes $TM_{SET}$, the timer 26 informs the CPU 25 of the matter, and when the value thereof becomes $TM_{LMT}$, the timer 26 clears itself to be 0.

Moreover, the position detection apparatus according to the third embodiment is connected for use to a motor controller 32 which transmits a request signal including the information named as "request discrimination bit". The request discrimination bit is information showing whether the request signal is a request signal or not having an exact period time-controlled by the hardware in the motor controller. For the convenience in explanation, hereinafter, a request signal having an exact period is marked as $RQ_0$, and other request signals are marked as $RQ_1$.

Figure 6:
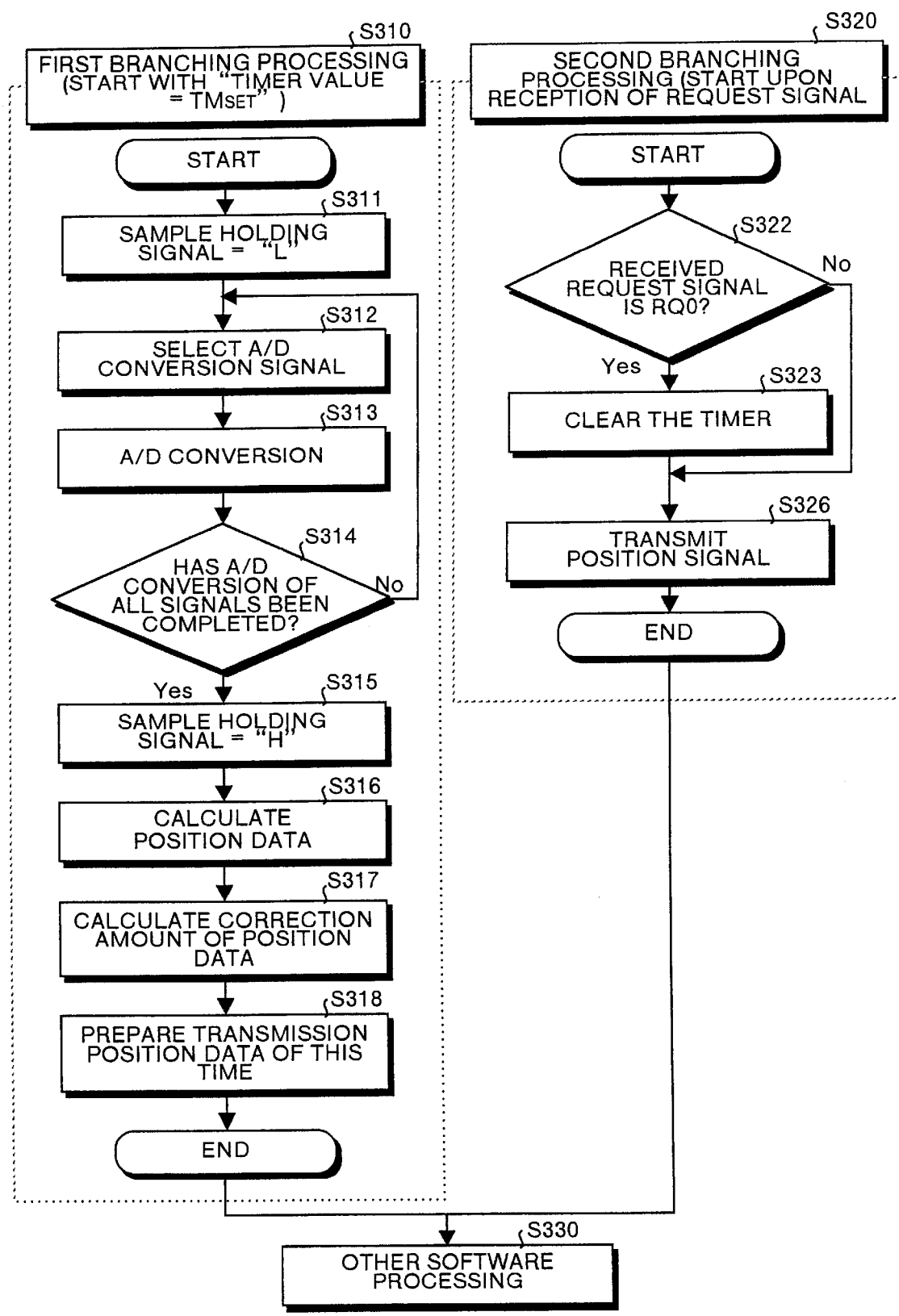
FIG. 6 is a flow chart showing the operation procedure of a CPU in a position detection apparatus according to a third embodiment of the present invention.

The CPU 25 in the position detection apparatus according to the third embodiment suspends other active software processing, when the value of the timer 26 becomes $TM_{SET}$, as shown in FIG. 6, and executes the first branching processing (step S310, steps S311 to S318). The first branching processing is identical with the first branching processing executed by the CPU in the position detection apparatus according to the second embodiment, which has been described using FIG. 4, and hence the description thereof is omitted.

When the request signal is received, the CPU 25 starts the second branching processing (step S320), and first judges if the request signal is the request signal $RQ_0$ having the exact period, or the request signal $RQ_1$ of a period not necessarily being exact period, based on the request discrimination bit included in the received request signal (step S321).

If the received request signal is the request signal $RQ_0$ (step S321: Yes), the CPU 25 clears the timer 26 to be 0 (step S322), and then transmits the position signal (step S323), to thereby complete the second branching processing. On the other hand, if the received request signal is not the request signal $RQ_0$ (step S321: No), the CPU 25 transmits the position signal without clearing the timer 26 to be 0 (step S323), and completes the second branching processing.

Figure 7:
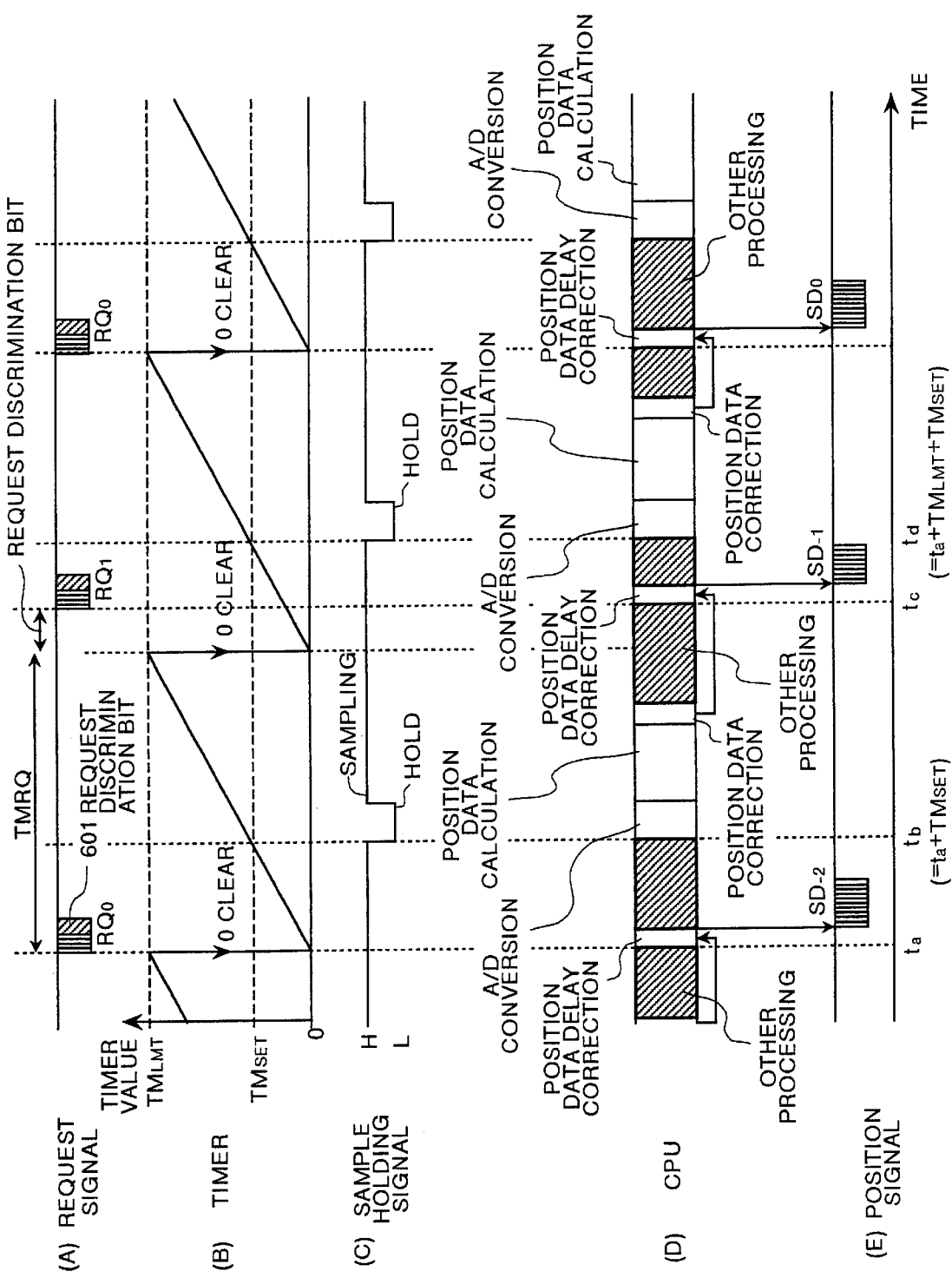
FIG. 7 is a timing chart for explaining the operation of the position detection apparatus according to the third embodiment.

The operation of the position detection apparatus according to the third embodiment will now be described more specifically with reference to FIG. 7. A case in which the motor controller 32 outputs alternately the request signal $RQ_0$ and the request signal $RQ_1$ is taken as an example. In FIG. 7, (A) illustrates a timing for the position detection apparatus 10 to receive a request signal from the motor controller 32, (B) illustrates the time change in a value of the timer 26 in a microcomputer 18. (C) illustrates the timing that a sample holding signal is output from the microcomputer 18 to a sample holding section 15, and (D) illustrates the time change in the contents of processing executed by the CPU 25. Finally, (E) illustrates the timing when a position signal is transmitted from the position detection apparatus 10.

As shown in this figure, when the request signal is received at time $t_a$, transmission of a position signal holding the transmission position data $SD_{-2}$ is performed. Since the received request signal is the request signal $RQ_0$, processing for obtaining the transmission position data $SD_{-1}$ is started at time $t_b$ ($=t_a+TM_{SET}$), which is a time when time $TM_{SET}$ has passed since the reception time.

Thereafter, when the request signal is received at time $t_c$, transmission of the transmission position data $SD_{-1}$ is performed. However, since the request signal is the request signal $RQ_1$, processing for obtaining the transmission position data $SD_0$ is started at time $t_d$ when time $TM_{LMT}+TM_{SET}$ has passed since the reception time $t_a$ of the request signal $RQ_0$, not at a time when time $TM_{SET}$ has passed since the time $t_c$ (not using the reception of request signal $RQ_1$ as a turning point).

As described above, with the position detection apparatus according to the third embodiment, the request signal $RQ_0$ is used as a signal for deciding a timing for starting the processing for obtaining the position data, and as a signal for deciding a timing for executing the data transmission to the motor controller. On the other hand, the request signal $RQ_1$ is used only as a signal for deciding timing for executing the data transmission to the motor controller, and the start timing of the processing for obtaining the position data transmitted at the time of data transmission is decided on the basis of the reception time of the request signal $RQ_0$.

Accordingly, if this position detection apparatus is combined with a motor controller which adds a request discrimination bit showing that it is a signal of an exact period to a request signal having an exact period controlled by the hardware, and adds a request discrimination bit showing that it is a signal of not necessarily an exact period to a request signal controlled by the software, even if there is a change in the transmission timing of the request signal controlled by the software, control of the motor itself can be performed precisely. In addition, such a motor controller can be realized by a slight modification to a conventional motor controller.

The position detection apparatus according to the fourth embodiment is the one obtained by modifying the position detection apparatus according to the first embodiment, hence, only a portion where the operation thereof is different from the first embodiment will be described here.

The position detection apparatus according to the first embodiment transmits a position signal comprising 7 frames, every time it receives a request signal, in the same manner as the conventional position detection apparatus. However, the position detection apparatus according to the fourth embodiment transmits a position signal comprising 7 frames at the time of the first communication with the motor controller, and transmits a position signal comprising 5 frames at the time of later communication.

Figure 8:
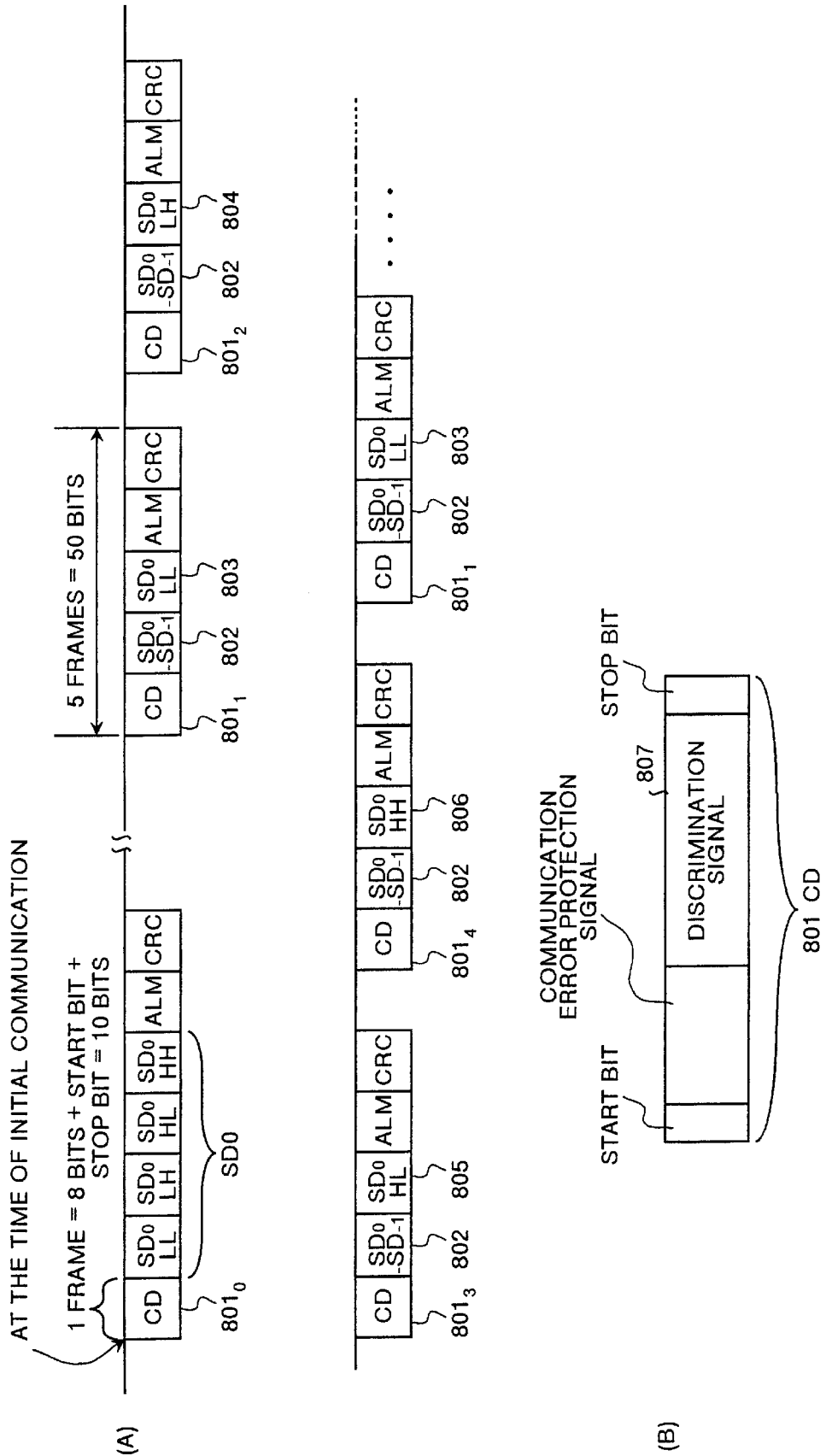
FIG. 8 is a flow chart showing the operation procedure of a CPU in a position detection apparatus according to a fourth embodiment of the present invention.

The format of the position signal transmitted by the position detection apparatus according to the fourth embodiment and the transmission procedure will now be described with reference to FIG. 8. In this figure, the frame (data), position signal shown at the left is transmitted first. Also, the control operation of the CPU 25 described below is performed in the step corresponding to the steps S124 and S125 in FIG. 2.

As shown in FIG. 8(A), the signal transmitted by the position detection apparatus according to the fourth embodiment starts with CD, as with the signal transmitted by the conventional position detection apparatus (see FIG. 12) and ends with ALM and CRC. However, the position detection apparatus uses as CD the one in which a portion that is not utilized as a communication error protection signal is utilized as a discrimination signal, as shown in FIG. 8(B).

When communicating with the motor controller 32 for the first time (when first informing the motor controller 32 of the position data), as shown in FIG. 8(A), the CPU 25 in the position detection apparatus controls each section (mainly, a serial signal conversion circuit 19) such that a signal of 7 frames comprising CD, $SD_0$, ALM and CRC (hereinafter, referred to as "initial communication signal") is transmitted, in the same manner as that of the conventional position detection apparatus. At this time, the CPU 25 controls such that CD $801_0$ including a discrimination signal 807 showing that the own signal is the initial communication signal is transmitted as CD.

After the transmission of the initial communication signal has been completed, the CPU 25 controls each section such that a signal is transmitted which includes, instead of $SD_0$, byte data representing a difference between the transmission position data $SD_{-1}$ last time and the transmission position data $SD_0$ this time, "$SD_0-SD_{-1}$", and one of four byte data constituting $SD_0$, which is a signal including CD 801 in which the discrimination signal 807 showing which is included of the four bytes constituting $SD_0$ is set.

More specifically, after the transmission of the initial communication signal has been completed, an d when the transmission position data is output for the first time, the CPU 25 controls such that a signal is transmitted which includes the differerence between the transmission position data $SD_{-1}$ last time and the transmission position data $SD_0$ this time, "$SD_0-SD_{-1}$", $_{SD0}$ LL 803, being the first byte of the transmission position data $SD_0$ this time, and CD $801_1$ showing that $SD_0$ LL is included.

When the transmission position data is output next time, the CPU 25 controls such that a signal is transmitted which includes the difference between the transmission position data $SD_{-1}$ last time and the transmission position data $SD_0$ this time, "$SD_0-SD_{-1}$", $SD_0$ LH 804, being the second byte of the transmission position data $SD_0$ this time, and CD $801_2$ showing that $SD_0$ LH is included. Thereafter, when the transmission position data is output next time, the CPU 25 controls such that a signal including "$SD_0-SD_{-1}$", $SD_0$ HL 805, being the third byte of the transmission position data $SD_0$, and CD $801_3$ showing that $SD_0$ HL is included is transmitted.

Also, when the transmission position data is output next time, the CPU 25 controls such that a signal including "$SD_0-SD_{-1}$", $SD_0$ HH 806, being the fourth byte of the transmission position data $SD_0$, and CD $801_4$ showing that $SD_0$ HH is included is transmitted.

After a signal including $SD_0$ HH has been transmitted, and when the transmission position data is transmitted, the CPU 25 controls each section such that a signal including $SD_0$ LL is transmitted.

That is to say, the CPU 25 in the position detection apparatus according to the fourth embodiment controls each section such that a signal of 7 frames comprising 4 byte $SD_0$ is transmitted, at the time of the first time transmission of the transmission position data. Also, the CPU 25 controls each section such that at the time of transmission of the transmission position data for the time of "4×I−2" (I is a natural number), a signal including $SD_0$ LL is transmitted, and at the time of transmission of the transmission position data for the time of "4×I−1", a signal including $SD_0$ LH is transmitted. Moreover, the CPU 25 controls each section such that at the time of transmission of the transmission position data for the time of "4×I+1", a signal including $SD_0$ HH is transmitted.

Since the position detection apparatus according to the fourth embodiment is constructed so as to operate in this manner, the time required for informing the motor controller of the detection result of the position becomes shorter than before. Specifically, when the transfer speed of the serial communication is 2.5 Mbps, as described already, the time required for conventional transmission of signal is 28 μs. On the other hand, the time required for transmission of signal output by the position detection apparatus according to the fourth embodiment is 20 μs (=50/(2.5×10$^6$)), since the number of bits of the signal is 50 bits.

Therefore, if this position detection apparatus is combined with a motor controller 32 which stores the transmission position data informed in the initial communication signal as absolute position data, and thereafter, every time the position signal is informed from the position detection apparatus, the difference data included in the position signal is added to the absolute position data, and handles the absolute position data after calculation as data representing the position of the slit disc 13 (and a motor connected thereto) at that point of time, a system operating with a request signal period shorter than before can be obtained, in other words, information for control of motor or the like can be obtained more frequently. As a result, a system in which control of motor or the like can be performed more appropriately can be constructed.

With the position detection apparatus according to the fourth embodiment, the reason why only one frame is secured for "$SD_0$-$SD_{-1}$" is that the motor whose position is detected by the position detection apparatus is rotating at 4500 rpm, which is generally the maximum speed, and if it is assumed that the request signal period from the motor controller is 50 μs, since the number of bits for the data of angle of rotation of the present apparatus is 16 bits, the variation in the position data when 50 μs has passed can be expressed in one byte (The variation is 4500/60×50×10$^{-6}$× 2$^{16}$=245 data). If the apparatus is used under a condition that "$SD_0$-$SD_{-1}$" cannot be expressed in one byte, it is a matter of course that two (or more) bytes are secured for "$SD_0$-$SD_{-1}$".

Moreover, the reason why a signal including any one of $SD_0$ LL, $SD_0$ LH, $SD_0$ HL and $SD_0$ HH in addition to "$SD_0$-$SD_{-1}$" is transmitted is for the motor controller side to be able to verify the absolute position data using $SD_0$ LL or the like. Hence, it is possible to modify the position detection apparatus according to the fourth embodiment such that a signal including "$SD_0$-$SD_{-1}$" but not including $SD_0$ LL or the like is output.

The position detection apparatus according to the fifth embodiment is the one obtained by modifying the position detection apparatus according to the second embodiment, and is connected for use to a motor controller 32 which transmits the request signal in a period $I_{RQ}$, and which can receive the position data even when the request signal is not transmitted. Moreover, the CPU 25 in the position detection apparatus is provided with $TM_{SET}$, $TM_{LMT}$ (>$TM_{SET}$) whose value coincides with the request signal transmission period $I_{RQ}$, and a threshold value $V_t$ of the position change rate, before starting to use the position detection apparatus.

Figure 9:
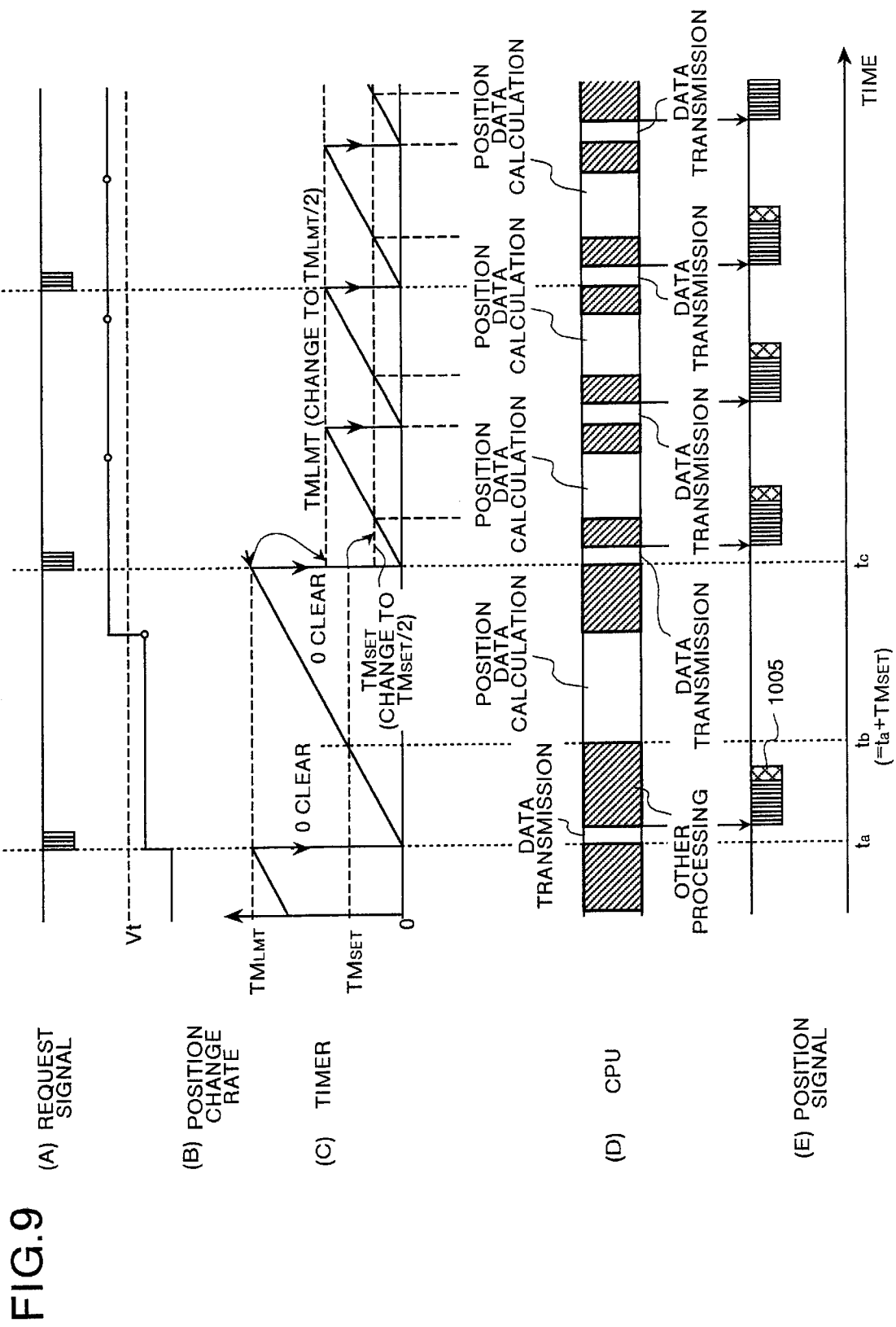
FIG. 9 is a diagram showing the operation of a position detection apparatus according to a fifth embodiment.
Figure 10:
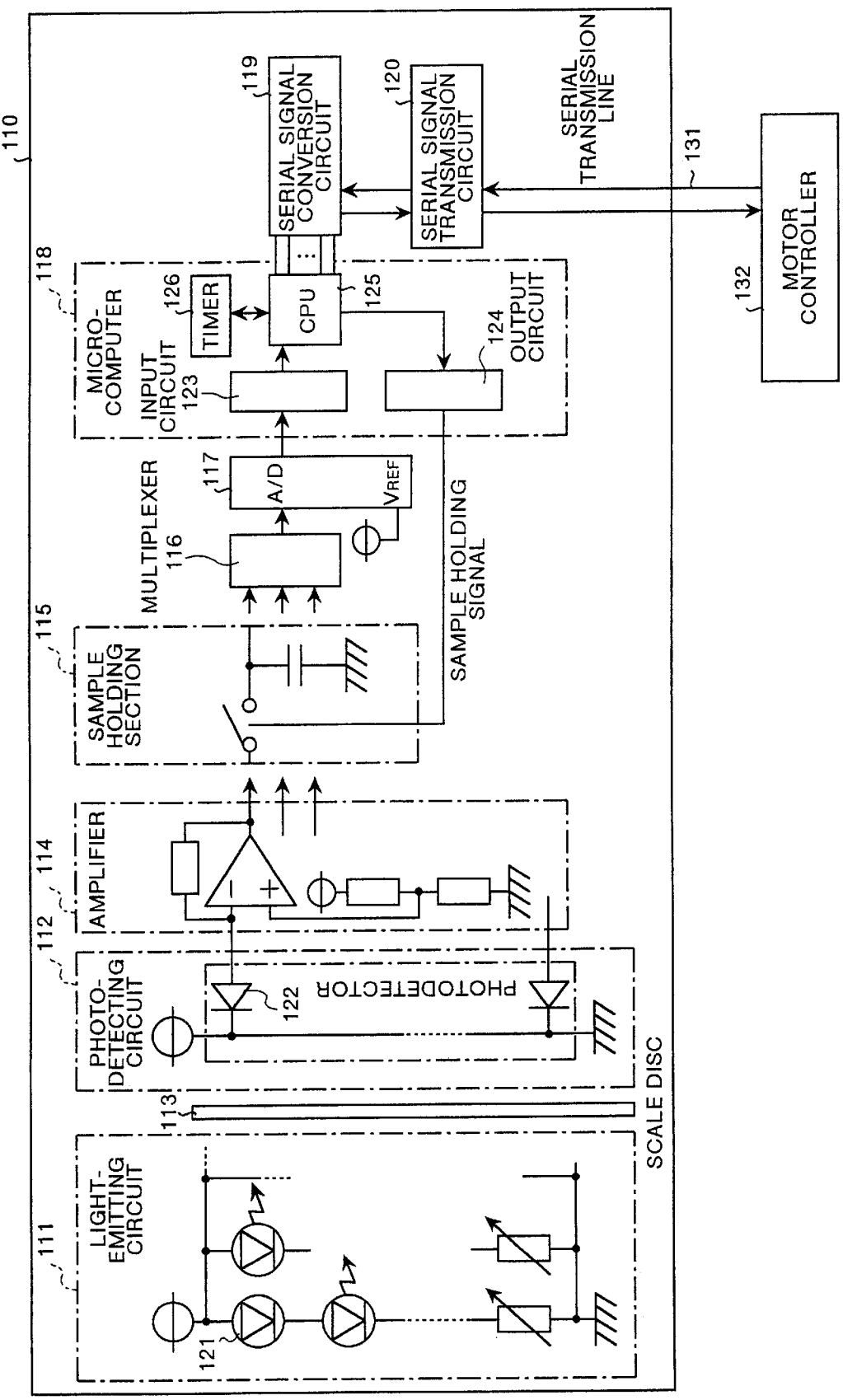
FIG. 10 is a diagram showing a construction of a position detection apparatus in the prior art.
Figure 11:
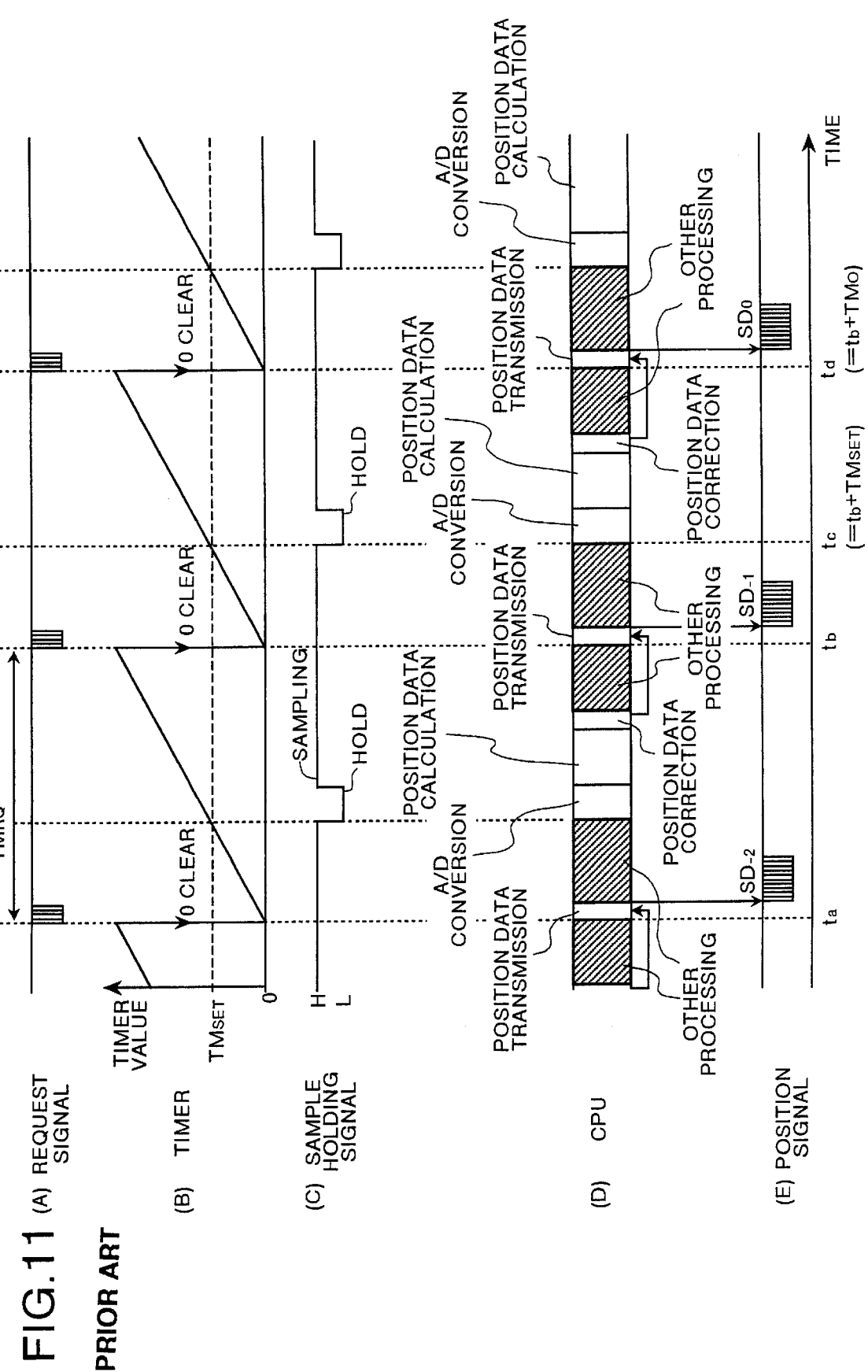

The operation of the position detection apparatus according to the fifth embodiment will be described below with reference to FIG. 9. In FIG. 9, (A) illustrates a timing for the position detection apparatus 10 to receive a request signal from the motor controller 32, (B) illustrates a time change in the position change rate "($SD_0$-$SD_{-1}$)/$TM_{LMT}$". (C) illustrates the time change in a value of the timer 26 in the microcomputer 18, and (D) illustrates the time change in the contents of processing executed by the CPU 25. Finally, (E) illustrates the timing when a position signal is transmitted from the position detection apparatus.

The position detection apparatus according to the fifth embodiment has two operation modes. That is, a normal mode and a high-speed mode. The normal mode is an operation mode selected when the position change rate specified by ($SD_0$-$SD_{-1}$)/$TM_{LMT}$ is $V_t$ or lower. The high-speed mode is an operation mode selected when the position change rate exceeds $V_t$.

In the normal mode, the CPU 25 in the fifth embodiment operates similarly to the CPU 125 in the conventional position detection apparatus 110, except that the CPU 25 judges if the position change rate exceeds $V_t$ or not.

For example, in the normal mode, when the request signal is received at time $t_a$, the CPU 25 clears a timer 26 to be 0, and controls a serial signal conversion circuit 19 or the like such that a position signal including the already calculated transmission position data is transmitted on a serial transmission line 31. Moreover, when the value of the timer 26 coincides with $TM_{SET}$ (at time $t_b$), the CPU 25 executes processing starting with the supply of the sample holding signal at level "L" to a sample holding section 15, to thereby calculate the transmission position data. Thereafter, when the request signal is received (at time $t_c$), the CPU 25 controls the serial signal conversion circuit 19 or the like such that a position signal including the transmission position data is transmitted on the serial transmission line 31.

While executing such processing, the CPU 25 also judges if the position change rate "($SD_0$-$SD_{-1}$)/$TM_{LMT}$" calculated from the transmission position data $SD_0$ calculated this time and the transmission position data $SD_{-1}$ calculated last time is $V_t$ or lower. Here, this judgement is performed at the time of completion of the position data calculation processing, as schematically shown by a circle in FIG. 9(B). Then, at the time of reception of the request signal, control corresponding to the judgement result is performed.

Specifically, when operating in the normal mode and detecting that the position change rate exceeds $V_t$, the CPU 25 clears the timer 26 to be 0 at the time of reception of the request signal, as well as making the value of $TM_{LMT}$ and $TM_{SET}$ half, respectively. Also, the CPU 25 changes the operation mode to the high-speed mode. Thereafter (at the time of high-speed mode), the CPU 25 executes similar control to that of the CPU 25 in the position detection apparatus according to the second embodiment wherein N=2.

That is to say, in the high-speed mode, the CPU 25 starts processing for calculating the transmission position data, when the value of the timer 26 coincides with the $TM_{SET}$ after the change, and performs control for transmitting a signal including the transmission position data obtained by the processing, when the value of the timer 26 coincides with the $TM_{LMT}$ (please see after the time $t_c$ in FIG. 12). The CPU 25 calculates the data for angle of rotation of M" bits from M measurement data, in this high-speed mode. Here, M" is a number of bits less than the number of bits M' of the data for angle of rotation calculated in the normal mode, and set in advance so that the position data can be calculated twice and the position signal including the position data can be transmitted twice during the request signal period $I_{RQ}$.

Moreover, in the high-speed mode, the CPU 25 judges whether or not the position change rate is $V_t$ or lower, and under a condition that it is judged that the position change rate is $V_t$ or lower, when the request signal is received, the CPU 25 changes the operation mode to the normal mode. That is to say, the CPU 25 clears the timer 26 to be 0, and doubles the value of $TM_{LMT}$ and $TM_{SET}$ (returns the value to the initial value), respectively.

Furthermore, the CPU 25 controls each section such that a signal including attribute information 1005 comprising information showing the operation mode is in the normal mode or the high-speed mode and a periodic number together with the transmission position data can be transmitted as a position signal, and the motor controller 32 interprets the position data included in the received position signal based on the attribute information.

As described above, the position detection apparatus according to the fifth embodiment automatically changes the transmission period or the like of the position data, depending on the position change rate of the slit disc 13. Hence, when a synchronous motor is operated at a high speed, the motor controller combined with this position detection apparatus can recognize the position of the magnetic pole of a permanent magnet in the synchronous motor in a short period, though a rough precision, and when the synchronous motor is operated at a normal speed, the motor controller can recognize the position of the magnetic pole of the permanent magnet in the synchronous motor at high precision and in a suitable period. As a result, use of this position detection apparatus enables efficient control of the motor. It is mentioned above that the position detection apparatus according to the fifth embodiment makes $TM_{LMT}$ or the like 1/2. However, it is needless to say that, $TM_{LMT}$ or the like may be made 1/K (where K is an integer equal to or greater than 3). Moreover, the position detection apparatus according to the fifth embodiment has two operation modes. However, this apparatus may be provided with two or more thresholds related to the position change rate, and has three or more operation modes.

Furthermore, the position detection apparatus according to the fifth embodiment is an apparatus which changes the operation mode depending on the measured (calculated) position change rate, but it may be such that a motor controller is for transmitting a request signal including information specifying the precision of required position data and the transmission period, and the position detection apparatus is an apparatus for outputting the position data at a precision and at a transmission period according to the information included in the request signal.

The position detection apparatus in each embodiment may be modified in the manner other than being described above.

For example, by modifying the position detection apparatus in the second, third and fifth embodiments, it is possible to construct a position detection apparatus in which a transmission procedure used in the position detection apparatus according to the fourth embodiment is used as the transmission procedure of the position signal. Also, by modifying the position detection apparatus in each embodiment, it is possible to construct a position detection apparatus in which a position signal is transmitted to control equipment such as a motor controller by a parallel transmission line. Moreover, the position detection apparatus in each embodiment is a so-called rotary encoder, but it is a matter of courts that a technique shown in each embodiment may be applied to an apparatus which detects other than the angle of rotation.

Industrial Applicability

As described above, the position detection apparatus according to the present invention is useful as an output source of position data required for controlling equipment such as synchronous motor which moves an object to be measured, and in particular, is suitable to be used for supplying the position data to the equipment in which high-speed control is desired.

What is claimed is:

1. A position detection apparatus for outputting position data representing a position of an object to be measured, comprising:

a detection unit which detects reception of a request signal for requesting output of the position data;

a sensor output measurement unit which measures the output of a sensor for detecting the position of said object, when a predetermined time has passed since reception of the request signal was detected by said detection unit;

a position data calculation unit which calculates the position data representing the position of said object at a point of time when the measurement was performed, based on the output measured by said sensor output measurement unit;

a reception interval measurement unit which measures a reception interval of the request signal;

a corrected position data calculation unit which calculates corrected position data which is position data representing the position of said object at the time of receiving the request signal whose reception interval was measured, using the reception interval of the request signal, the predetermined time, the position data calculated by said position data calculation unit, and a presumed speed of said object; and an output unit which outputs the corrected position data calculated by said corrected position data calculation unit as a response to the request signal.

2. The position detection apparatus according to claim 1, further comprising a transmission unit which transmits a signal having a first predetermined number of bits representing corrected position data, on a serial transmission line to which the equipment which outputs the request signal is connected, as a detection result, with regard to the corrected position data first output by said corrected position data output unit, and transmits a signal having a second predetermined number of bits, which is smaller than the first predetermined number of bits, representing a difference between the corrected position data and corrected position data output last time, and/or a signal added with a part of the signal output this time, on said serial transmission line, as a detection result, with regard to the corrected position data output for the second time and after by said corrected position data output unit.

3. A position detection apparatus for outputting position data representing a position of an object to be measured, comprising:

a detection unit which detects reception of a request signal for requesting output of the position data;

a measurement processing execution unit which executes processing for measuring the output of a sensor for detecting the position of said object, every time multiples of time of an output period given in advance, being a period of an integral fraction of a period of the request signal, has passed after a predetermined time has passed since the detection of the request signal, every time the reception of the request signal is detected by said detection unit;

a position data calculation unit which calculates position data representing the position of said object at a point of time when measurement is performed, using the measured output, every time the output of said sensor is measured by said measurement processing execution unit;

a corrected position data calculation unit which calculates the corrected position data, being position data representing the position of said object at a point of time first reached after measurement of the output by said measurement processing execution unit, which is a point of time when multiples of time of the output period has passed since the reception of the request signal, using a calculated position data, every time the position data is calculated by said position data calculation unit, the output period, the predetermined time and change rate of a presumed position of said object; and a corrected position data output unit which outputs the calculated corrected position data, every time the corrected position data is calculated by said corrected position data calculation unit, at a time when the corrected position data represents a position.

4. The position detection apparatus according to claim 3, further comprising a transmission unit which transmits a signal having a first predetermined number of bits representing corrected position data, on a serial transmission line to which the equipment which outputs the request signal is connected, as a detection result, with regard to the corrected position data first output by said corrected position data output unit, and transmits a signal having a second predetermined number of bits, which is smaller than the first predetermined number of bits, representing a difference between the corrected position data and corrected position data output last time, and/or a signal added with a part of the signal output this time, on said serial transmission line, as a detection result, with regard to the corrected position data output for the second time and after by said corrected position data output unit.

5. The position detection apparatus according to claim 3 further comprising:

a monitoring unit which monitors the change rate of a position of said object; and an output period change unit which changes the output period to a value which is an integral fraction of a period of the request signal, depending on the monitoring result of said monitoring unit.

6. The position detection apparatus according to claim 5, further comprising a transmission unit which transmits a signal having a first predetermined number of bits representing corrected position data, on a serial transmission line to which the equipment which outputs the request signal is connected, as a detection result, with regard to the corrected position data first output by said corrected position data output unit, and transmits a signal having a second predetermined number of bits, which is smaller than the first predetermined number of bits, representing a difference between the corrected position data and corrected position data output last time, and/or a signal added with a part of the signal output this time, on said serial transmission line, as a detection result, with regard to the corrected position data output for the second time and after by said corrected position data output unit.

7. The position detection apparatus according to claim 5, further comprising a bit length changing unit which changes the bit length of the position data transmitted on said serial transmission line, depending on the monitoring result of said monitoring unit.

8. The position detection apparatus according to claim 7, further comprising a transmission unit which transmits a signal having a first predetermined number of bits representing corrected position data, on a serial transmission line to which the equipment which outputs the request signal is connected, as a detection result, with regard to the corrected position data first output by said corrected position data output unit, and transmits a signal having a second predetermined number of bits, which is smaller than the first predetermined number of bits, representing a difference between the corrected position data and corrected position data output last time, and/or a signal added with a part of the signal output this time, on said serial transmission line, as a detection result, with regard to the corrected position data output for the second time and after by said corrected position data output unit.

9. The position detection apparatus according to claim 3, wherein the request signal includes assignment information for assigning the output period, and said position detection apparatus further comprising an output period change unit which changes the output period to a value which is an integral fraction of a period of the request signal, depending on the assignment information included in the request signal detected by said detection unit.

10. The position detection apparatus according to claim 9, further comprising a transmission unit which transmits a signal having a first predetermined number of bits representing corrected position data, on a serial transmission line to which the equipment which outputs the request signal is connected, as a detection result, with regard to the corrected position data first output by said corrected position data output unit, and transmits a signal having a second predetermined number of bits, which is smaller than the first predetermined number of bits, representing a difference between the corrected position data and corrected position data output last time, and/or a signal added with a part of the signal output this time, on said serial transmission line, as a detection result, with regard to the corrected position data output for the second time and after by said corrected position data output unit.

11. A position detection apparatus for outputting position data representing a position of an object to be measured, comprising:

a detection discrimination unit which detects reception of a request signal for requesting an output of the position data, and discriminating whether the request signal whose reception has been detected is a first class request signal or a second class request signal;

a measurement processing execution unit which executs processing for measuring the output of a sensor for detecting the position of said object, every time multiples of time of a period of the request signal given in advance has passed, after a predetermined time has passed since the reception detection of the first class request signal, every time the reception of the first class request signal is detected by said detection discrimination unit;

a position data calculation unit which calculates position data representing the position of said object at a point of time when measurement is performed, using a measured output, every time the output of said sensor is measured by said measurement processing execution unit;

a corrected position data calculation unit which calculating the corrected position data, being position data representing the position of said object at a point of time first reached after measurement of the output by said measurement processing execution unit, which is a point of time when multiples of time of the period has passed since the reception of the first class request signal, using the position data, every time the position data is calculated by said position data calculation unit, the period, the predetermined time and change rate of a presumed position of said object; and a corrected position data output unit which outputs the calculated corrected position data, every time the corrected position data is calculated by said corrected position data calculation unit, after the calculation, as a response to the first class request signal or the second class request signal whose reception has been detected by said detection discrimination unit.

12. The position detection apparatus according to claim 11, further comprising a transmission unit which transmits a signal having a first predetermined number of bits representing corrected position data, on a serial transmission line to which the equipment which outputs the request signal is connected, as a detection result, with regard to the corrected position data first output by said corrected position data output unit, and transmits a signal having a second predetermined number of bits, which is smaller than the first predetermined number of bits, representing a difference between the corrected position data and corrected position data output last time, and/or a signal added with a part of the signal output this time, on said serial transmission line, as a detection result, with regard to the corrected position data output for the second time and after by said corrected position data output unit.

* * * * *